T. LOMBARDI.
NOODLE CUTTER.
APPLICATION FILED DEC. 18, 1911.
1,076,130.
Patented Oct. 21, 1913.
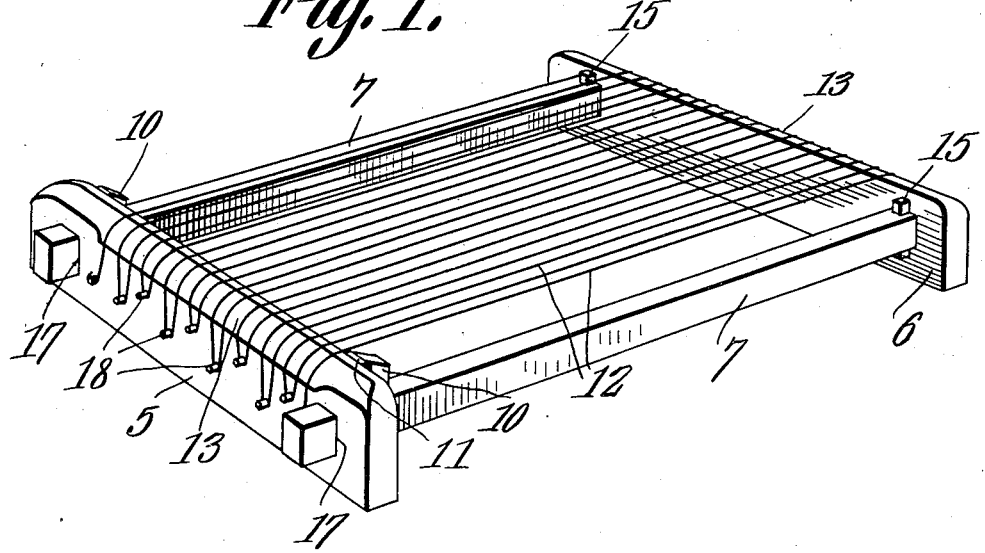
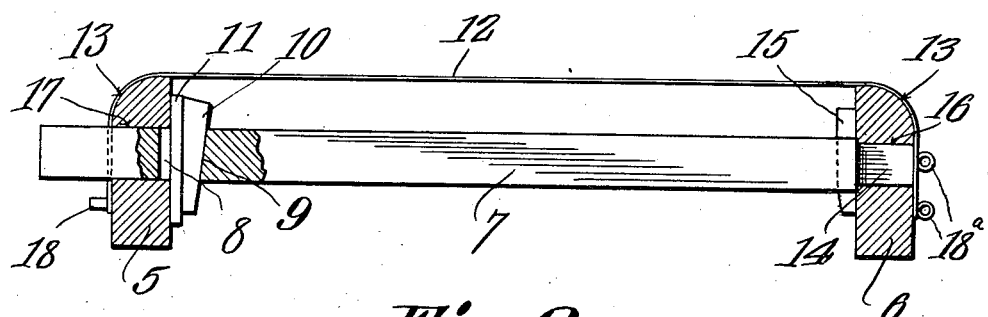
Thomas Lombardi
Inventor,

UNITED STATES PATENT OFFICE.

THOMAS LOMBARDI, OF McKEESPORT, PENNSYLVANIA.

NOODLE-CUTTER.

1,076,130.  Specification of Letters Patent.  Patented Oct. 21, 1913.

Application filed December 18, 1911. Serial No. 666,456.

*To all whom it may concern:*

Be it known that I, THOMAS LOMBARDI, a citizen of the United States, residing at McKeesport, in the county of Allegheny and State of Pennsylvania, have invented a new and useful Noodle-Cutter, of which the following is a specification.

This invention relates to noodle cutters and has for its object to provide a simple device of this character for conveniently and expeditely cutting sheets of dough into noodles.

This cutter is adapted especially for domestic purposes and is embodied in the novel construction and combination of parts hereinafter described and claimed, reference being had to the accompanying drawings, wherein similar reference characters indicate similar parts, and wherein:—

Figure 1 is a perspective view of the noodle cutter, constructed in accordance with the present invention. Fig. 2 is a side elevation thereof, parts broken away.

In carrying out the invention, there is provided a frame embodying a pair of parallel beams 5 and 6 and a pair of bars 7, the bars having the tenons 14 at one end and having the transverse slots 8 at the other end thereof, the inner wall of the said slots being inclined as designated by the numeral 9. The beam 6 has mortises 16 therein for the reception of the tenons 14, and the complementary beam 5 is mounted slidably upon the slotted ends of the bars 7, the beam 5 having transverse passages 17 therethrough through which the bars 7 pass. On the outer faces of the respective beams 5 and 6 are secured the staggered pins 18 and eyes 18ª, respectively, and a length of wire of suitable gage is passed back and forth over the upper edges of the beams 5 and 6 and around the members 18 and 18ª, thus providing a plurality of parallel cutting strands 12. Cotter pins 15 are driven into the ends of the bars 7 adjacent the tenons 14, the said pins bearing against the inner face of the beam 6 to retain the said beam against inward movement. Wedges 10 are driven into the slots 8 to spread the beams 5 and 6 by forcing the beam 5 outwardly, shims 11 being interposed between the wedges 10 and the beam 5. Thus by driving either or both of the wedges 10 inwardly, the strands 12 may be drawn taut. The upper and outer corners of the beams 5 and 6 are preferably rounded or beveled as designated by the numeral 13. The beams 5 and 6 are wider than the bars 7 to bring the upper and lower edges thereof in planes above and below the bars 7. The lower edges of the beam 5 are adapted to seat or rest upon a table or support and support the bars 7 above the table or support, and the strands 12 which pass over the upper edges of the beams lie in a plane spaced above the bars 7.

In use, the noodle cutter is placed on a table or other convenient object with the cutting strands uppermost and the sheet of dough to be formed into noodles is placed upon the cutting strands 12. The sheet of dough is then severed into noodles by the application of a roller pin over the strands from the upper edge of one beam to the upper edge of the other beam, thus pressing the dough through the strands to form noodles.

This device may be readily cleansed after being used, and is therefore hygienic, and from time to time, as the strands become loosened, the wedges 10 may be driven inward to again draw the strands taut. By removing the wedges 10 the device may be dismantled or knocked down for convenience in shipping or packing, or for the purpose of replacing worn or broken parts. The cutting strands on being drawn taut retain the beams in position on the bars and prevent the beams from moving off of the ends of the bars 7. The bars 7 also provide stops for preventing the excessive depression of the strands 12 by the roller pin.

This invention is also simple in construction, rendering it inexpensive to manufacture, and in use is both expeditious and convenient for the purposes for which it is designed.

What is claimed is:—

In a noodle cutter, a frame made up of two parallel bars and two parallel supporting beams having openings receiving the ends of the said bars, and each having a series of projections along its outer face, a wire passing back and forth over the upper edges of the beams, in a plane above the bars, and around the said projections to provide a plurality of cutting strands, and means carried by the bars for sliding one of the beams outwardly to tighten the wire.

In testimony that I claim the foregoing as my own, I have hereto affixed my signature in the presence of two witnesses.

THOMAS LOMBARDI.

Witnesses:
C. E. LENHART,
I. A. SIMON.